S. C. HARTSOCK.
DRAFT MEANS FOR VEHICLES.
APPLICATION FILED AUG. 30, 1920.
1,379,982.
Patented May 31, 1921.
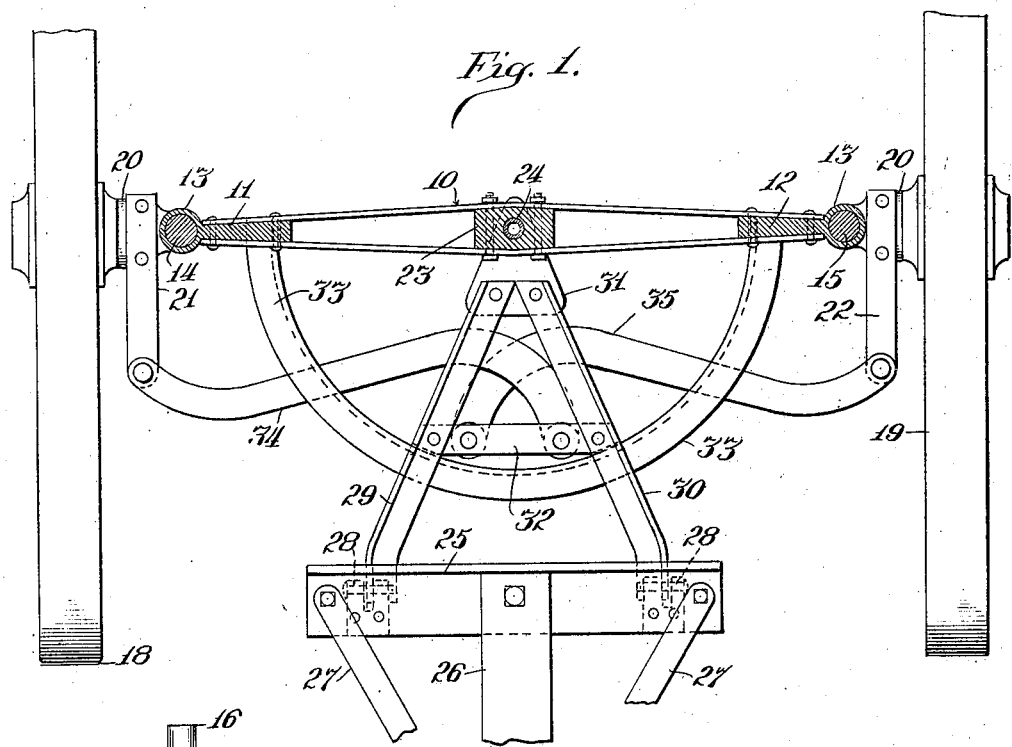
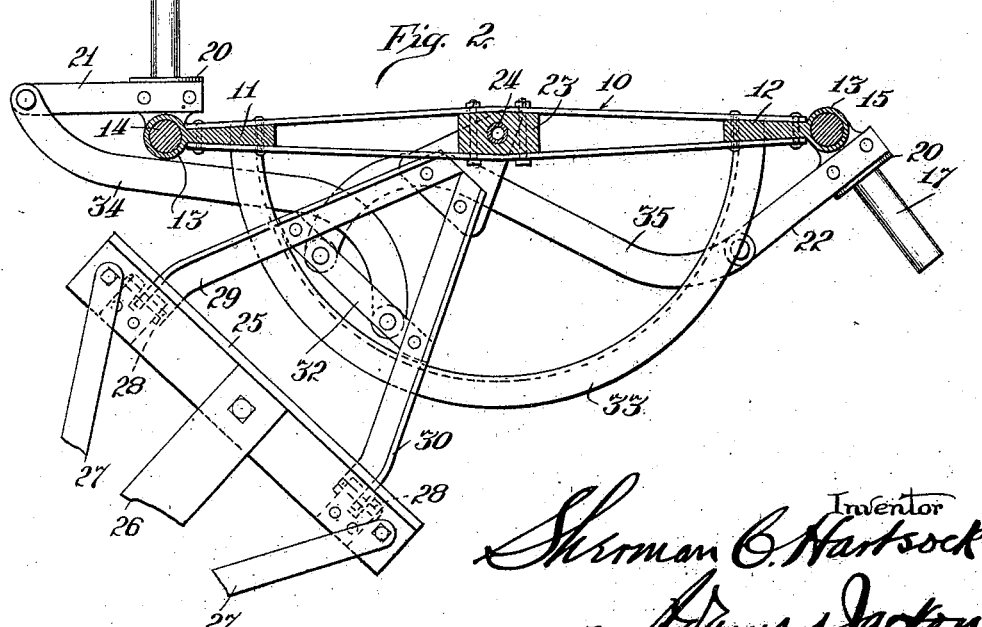

UNITED STATES PATENT OFFICE.

SHERMAN C. HARTSOCK, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

DRAFT MEANS FOR VEHICLES.

1,379,982. Specification of Letters Patent. Patented May 31, 1921.

Application filed August 30, 1920. Serial No. 406,877.

*To all whom it may concern:*

Be it known that I, SHERMAN C. HARTSOCK, a citizen of the United States, and a resident of Moline, in the county of Rock Island and State of Illinois, have invented certain new and useful Improvements in Draft Means for Vehicles, of which the following is a specification, reference being had to the accompanying drawings.

My invention relates to draft means for vehicles and particularly to the means by which the connection is effected between the tongue of the vehicle and the front wheels for applying the draft and for steering purposes. It is the principal object of my invention to provide a construction and arrangement by reason of which a sharp turn can be made with the steering wheels positioned so as to cause the body of the vehicle to swing around easily and smoothly, and by reason of which the tongue shall have the desired leverage upon the steering wheels for bringing them back to normal position with respect to the body. The preferred means by which I have accomplished my object is illustrated in the drawings and is hereinafter specifically described. That which I believe to be new and desire to secure by Letters Patent is set forth in the claim.

In the drawings,—

Figure 1 is a top or plan view of the connections between the steering wheels of a vehicle and the tongue by which the draft is applied; and Fig. 2 is a view similar to Fig. 1 but showing a changed position of the parts.

Referring to the drawings,—10 indicates the front axle of a vehicle comprising brackets 11 and 12 at its ends having vertical sleeves 13 in which are revolubly mounted the vertically-extending arms 14 and 15 of the axle members 16 and 17 respectively. Carrying wheels 18 and 19 are mounted upon the axle members 16 and 17 respectively, as shown in Fig. 1.

Upon each of the axle members 16 and 17 is secured a clip 20 of any suitable type, said clips having rigidly connected therewith forwardly-extending arms 21 and 22 which, in the construction shown, are parallel when the vehicle is being drawn forward in a straight path. At its central point the axle 10 is provided with a block 23 to which the tongue structure is pivotally connected by means of a bolt 24. As is clearly shown in the drawings, the tongue structure comprises an angle iron cross-bar 25 to which the tongue 26 is rigidly connected, diagonally-disposed brace bars 27 being provided for giving the tongue the proper lateral brace. The cross-bar 25 is pivotally connected by means of laterally-disposed pins 28 with the forward ends of diagonally-disposed bars 29 and 30 which are rigidly connected at their rear ends with a triangular plate 31 which is pivotally mounted upon the bolt 24. An intermediate cross bar 32 is connected between the bars 29 and 30 at about their middle point. A circle bar 33 is mounted upon the axle 10 and provides a support for the bars 29 and 30. As will be appreciated from an inspection of the drawings, the arrangement of the tongue structure is such that it is rigid laterally but adapted to swing about the bolt 24.

The forward ends of the arms 21 and 22 are pivotally connected by means of links 34 and 35 respectively with the laterally-disposed bar 32 of the tongue structure, the link at either side of the vehicle being connected with the opposite end portion of the bar 32. By the use of the links 34 and 35 arranged in this manner, a lateral movement of the tongue 26 serves to swing the arms 21 and 22 laterally in the same direction at the same time, causing the wheels 18 and 19 to swivel about their vertical axes 14 and 15. With the tongue 26 extending directly forward from the vehicle, the bars 21 and 22 are held in parallel position so as to hold the wheels 18 and 19 also in parallelism. When, however, the tongue is swung toward one side, the wheels are turned to direct the vehicle toward the same side, the wheel at the side toward which the vehicle is directed being turned more rapidly than the wheel at the opposite side. As will be seen by reference to Fig. 2, the inner end of the link 34 is some little distance in advance of the inner end of the link 35. This feature is of considerable importance, it being important that the inner end of the link 34 shall be positioned as far forward as possible, and equally important that the inner end of the link 35 be positioned as far to the rear as possible,—when the tongue is turned to the limit of its motion to one side as shown in this figure. By having the inner end of the link 34 in an advanced position, the line of centers between the pins by which the link is connected with the bar 32 and with the arm 21 stands at a maximum angle with respect to the line of centers between the pivotal connection of the link 34 to the arm 21 and the vertical axis of the axle member 16 upon the axle 10. On the other hand, by having the inner end of the link 35 in the rearmost possible position, the angle between the line of centers of the connections of the link 35 with the bar 32 and the arm 22 and the line of centers between the connection of the link 35 with the arm 22 and the vertical axis of the axle member 17 upon the frame 10, is likewise as great as possible. In this way the links 34 and 35 have the greatest possible effectiveness for turning the axle members from the position shown in Fig. 2 back to normal position as shown in Fig. 1 without danger of the structure becoming locked by passing substantially into alinement.

By the use of my arrangement, I am enabled to turn the steering wheels farther from normal position without danger of any parts passing into central locking position than can be done by the use of any prior construction of which I am aware. I, therefore, consider this feature as of very great importance, and my claim is to be construed accordingly.

What I claim as my invention and desire to secure by Letters Patent, is—

A draft means for a vehicle comprising a transversely-extending axle, short axle members pivotally mounted on vertical axes thereon, carrying wheels journaled on said pivotally-mounted axle members, a plate pivotally mounted on a vertical axis on said transversely-extending axle, two bars rigidly mounted on said plate and diverging forwardly therefrom, a cross-bar pivotally mounted on the forward ends of said diverging bars, a tongue carried by said cross bar, a second cross bar connecting said diverging bars at about their middle points, an arc-shaped bar mounted on said transversely-extending axle for slidingly supporting said diverging bars, arms rigidly mounted on said pivotally mounted axle members and extending forwardly therefrom, and links pivotally connected to said arms at their outer ends and pivotally connected to said second-named cross-bar at their inner ends, said links being crossed at their inner end portions whereby the link at either side is connected to the opposite end portion of said second cross bar.

SHERMAN C. HARTSOCK.